(12) United States Patent
Yeh

(10) Patent No.: US 8,116,085 B2
(45) Date of Patent: Feb. 14, 2012

(54) ELECTRONIC DEVICE AND SLIDING MECHANISM THEREOF

(75) Inventor: Chih-Shan Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 720 days.

(21) Appl. No.: 12/239,512

(22) Filed: Sep. 26, 2008

(65) Prior Publication Data

US 2009/0147451 A1 Jun. 11, 2009

(30) Foreign Application Priority Data

Dec. 6, 2007 (TW) ................................ 96146487 A

(51) Int. Cl.
*H05K 5/00* (2006.01)

(52) U.S. Cl. .................. 361/752; 455/575.4; 340/425.5; 345/660

(58) Field of Classification Search .................. 439/485, 439/607.1, 49, 534; 362/235, 249.16, 249.14; 324/762.03, 755.01; 174/350, 520; 361/752, 361/56, 679.4, 709, 807, 818, 679.01, 679.08, 361/679.09, 679.27, 679.52, 679.46, 679.31, 361/679.26, 679.11; 345/156, 157, 158, 345/1.3, 660, 173, 619, 174, 168; 340/693.5, 10.1, 425.5, 572.1, 521; 455/575.1, 566, 575.4, 575.3, 422.1, 41.2, 436

See application file for complete search history.

(56) References Cited

U.S. PATENT DOCUMENTS 7,066,766 B2 * 6/2006 Harasawa et al. ............. 439/630
2008/0005867 A1 * 1/2008 Wu ................................. 16/327

FOREIGN PATENT DOCUMENTS

CN 1929503 A 3/2007

* cited by examiner

*Primary Examiner* — Hung Duong

(74) *Attorney, Agent, or Firm* — Birch, Stewart, Kolasch & Birch, LLP

(57) ABSTRACT

A sliding mechanism is provided for movably connecting a display module and an input module of an electronic device. The sliding mechanism includes a first member and a second member reciprocally movable with respect to each other. The first member has a longitudinal slot, and the second member has a through hole. A flexible wire of the electronic device is extended through the longitudinal slot and the through hole for electrically connecting the display module and the input module.

16 Claims, 9 Drawing Sheets

ELECTRONIC DEVICE AND SLIDING MECHANISM THEREOF

CROSS REFERENCE TO RELATED APPLICATIONS

This Application claims priority of Taiwan Patent Application No. 96146487, filed on Dec. 6, 2007, the entirety of which is incorporated by reference herein.

TECHNICAL FIELD

The application relates in general to an electronic device and in particular to an electronic device having a sliding mechanism.

DESCRIPTION OF THE RELATED ART

Referring to FIG. 1, a conventional sliding-type mobile phone or PDA includes a display module 100 and an input module 200 reciprocally movable with respect to each other (as the arrows indicate in FIG. 1), wherein the display module 100 includes a screen 110, and the input module 200 includes a keypad 210.

Referring to FIG. 2A, a circuit board 101 is disposed in the display module 100, and another circuit board 201 is disposed in the input module 200. Specifically, a flexible printed circuit F is passed through an opening 102 of the display module 100 and an opening 202 of the input module 200 for electrically connecting the circuit boards 101 and 201.

Referring to FIG. 2B, when the display module 100 slides rightward relative to the input module 20 to an open state, the openings 102 and 202 overlap with the flexible printed circuit F extended therethrough. Overlap region of the two openings 102 and 202 is critical because it may adversely reduce available area of the keypad 210. To maximize dimensions of the keypad 210 of the sliding-type mobile phone or PDA, overlap region of the openings 102 and 202 has to be minimized. However, when overlap region of the two openings 102 and 202 is inadequate, the flexible printed circuit F can be exposed to the exterior through the opening 102, as shown in FIG. 2B. Thus, the flexible printed circuit F can be damaged by intrusions of external objects or the user through the opening 102.

BRIEF SUMMARY

The application provides a sliding mechanism movably connecting a display module and an input module of an electronic device. The sliding mechanism includes a first member and a second member reciprocally movable with respect to each other. The first member has a longitudinal slot, and the second member has a through hole. A flexible wire of the electronic device is passed through the longitudinal slot and the through hole for electrically connecting the display module and the input module.

BRIEF DESCRIPTION OF DRAWINGS

The application can be more fully understood by reading the subsequent detailed description and examples with references made to the accompanying drawings, wherein.

DETAILED DESCRIPTION

Figure 1:
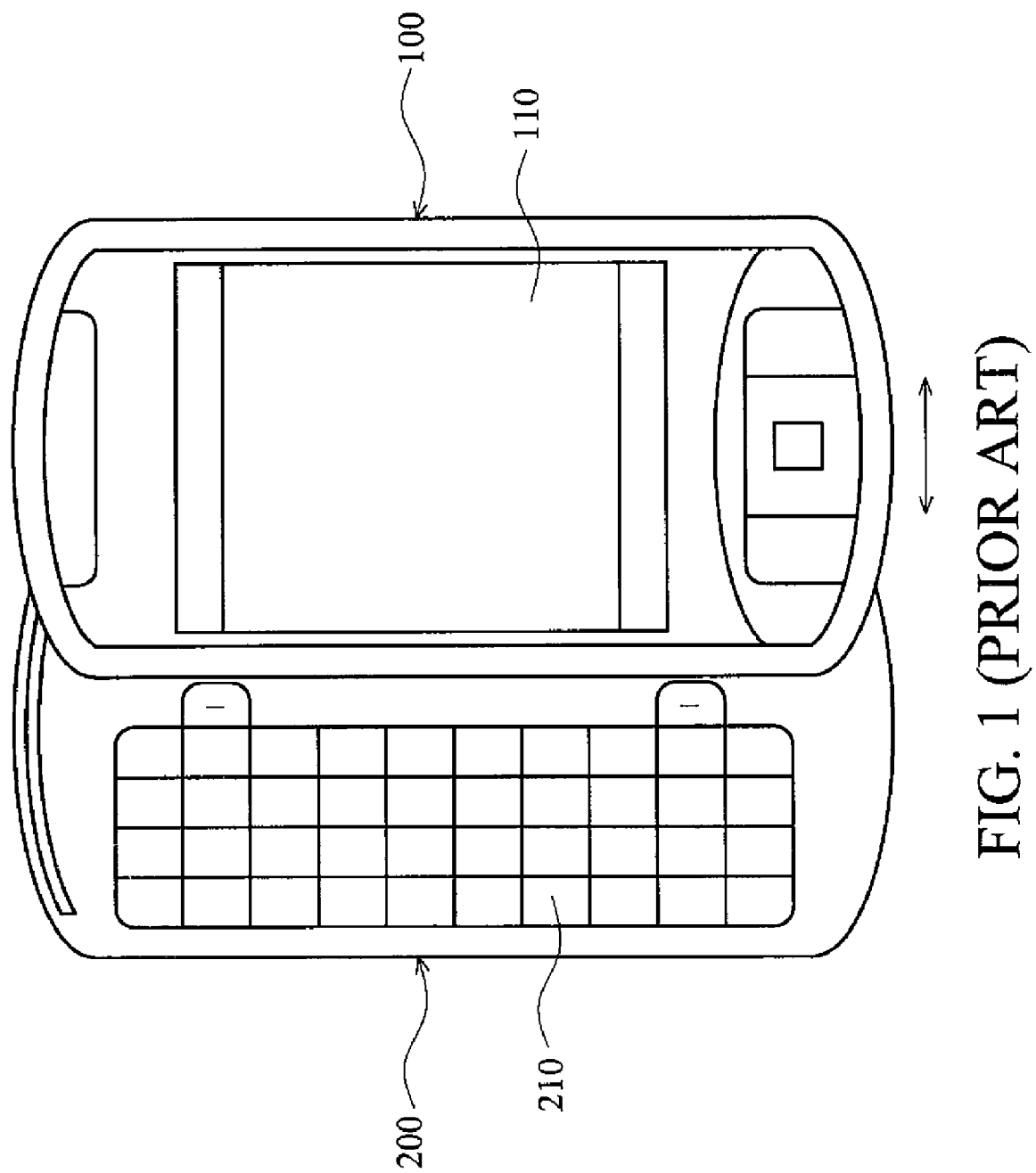
FIG. 1 is a perspective diagram of a conventional sliding-type electronic device.
Figure 2A:
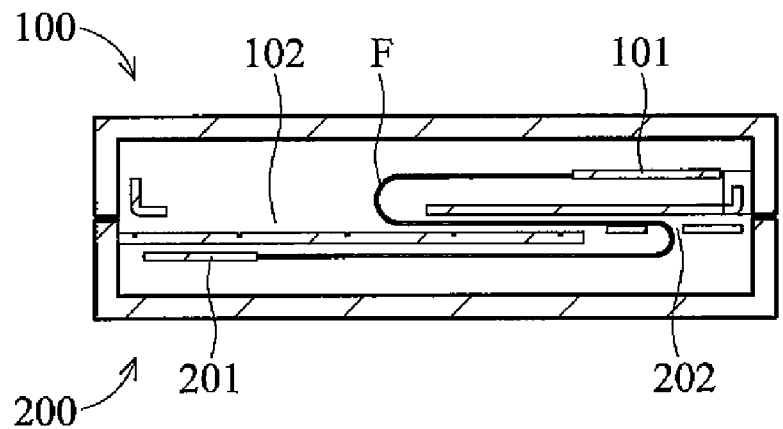
FIGS. 2A and 2B are sectional views of the electronic device in FIG. 1A.
Figure 2B:
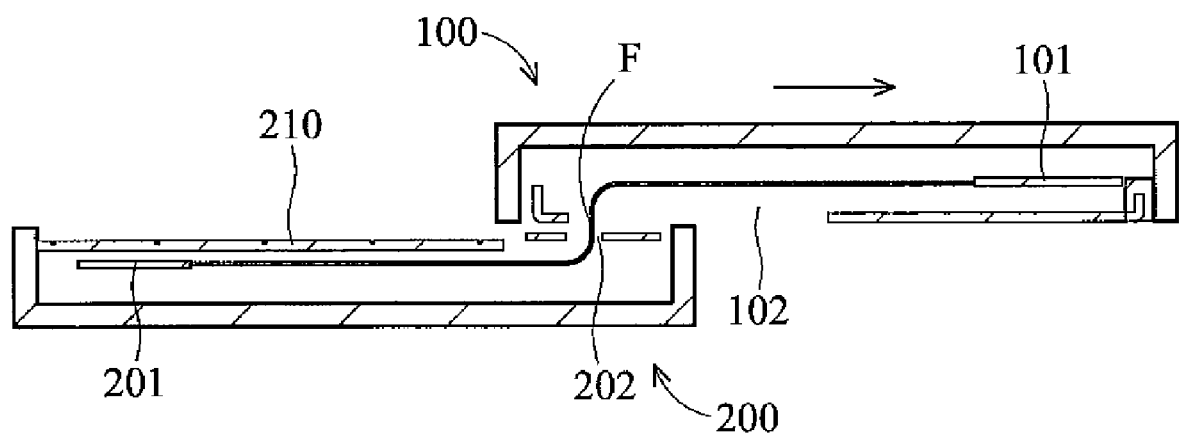
Figure 3:
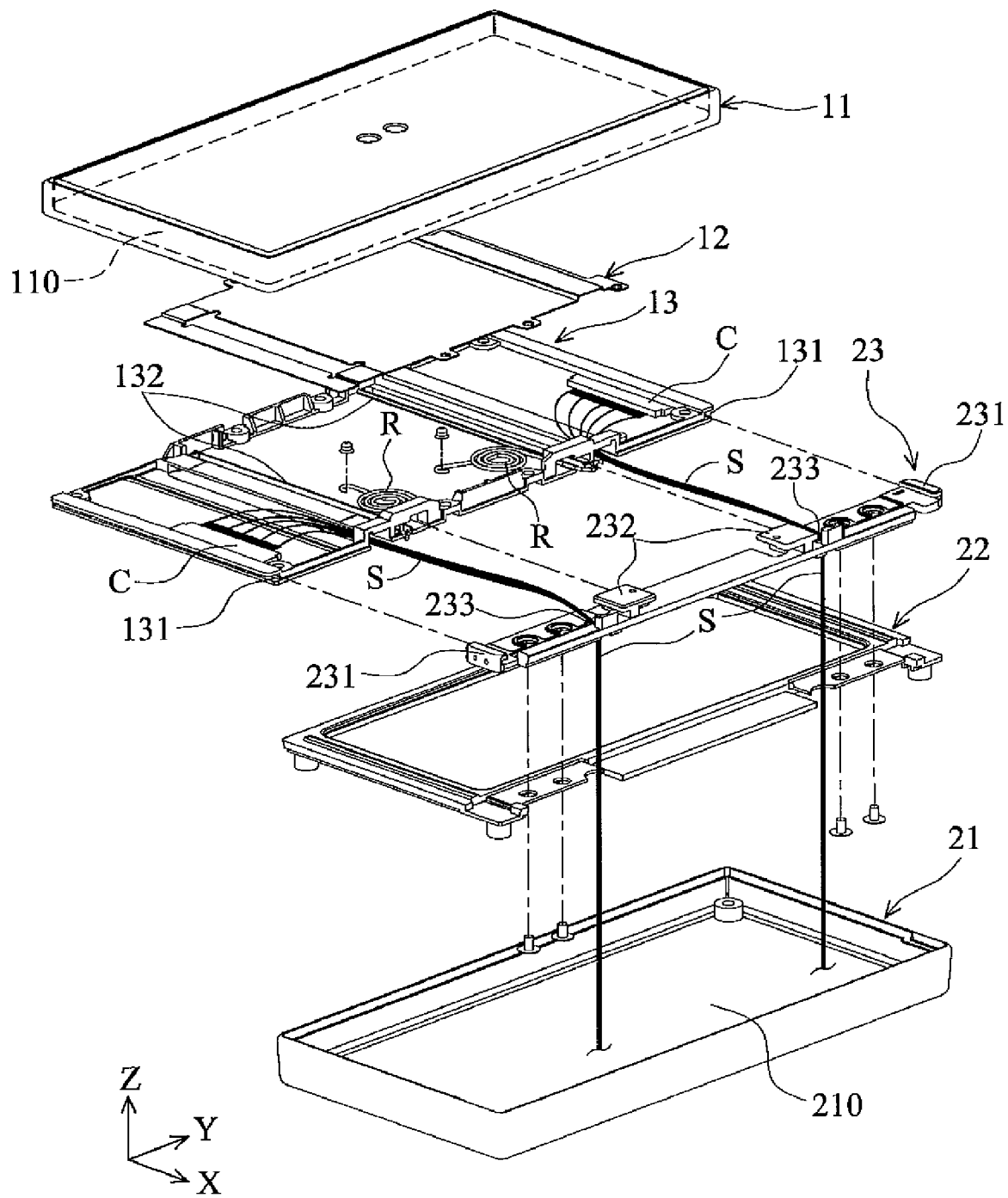
FIG. 3 is an exploded diagram of an embodiment of an electronic device.

Referring to FIG. 3, an embodiment of an electronic device, such as a sliding-cover mobile phone, PDA, ultra mobile personal computer (UMPC) or tablet PC, includes a first housing 11, a first member 13, a second housing 21, a second member 23, and at least a flexible wire S. As shown in FIG. 3, the first housing 11 has a first space 10 for disposing a display module (not shown), and the second housing 21 has a second space 210 for disposing an input module (not shown). The first and second members 13 and 23 are reciprocally movable with respect to each other and comprise a sliding mechanism between the first ands second housings 11 and 21.

The first member 13 has two rails 131 at opposite edges thereof, and the second member 23 has two sliding portions 231 at opposite edges thereof sliding along the rails 131. However, the rails 131 and sliding portions 231 can also be disposed at other positions, rather than the edges of the first and second members 13 and 23. Specifically, two longitudinal openings 132 are formed in the middle of the first member 13, and two sliders 232 of the second member 23 are movably received in the longitudinal openings 132, wherein the sliders 232 can be T-shaped in cross-section. In this embodiment, the rails 131 and sliding portions 231 are optional and can be eliminated when the longitudinal openings 132 and sliders 232 are applied.

To achieve semi-auto sliding of the electronic device, two elastic members R are disposed on an upper surface of the first member 13, respectively connecting the first member 13 and the sliders 232. As shown in FIG. 3, the elastic members R are covered and protected by a shield 12 of the electronic device disposed on the first member 13.

In this embodiment, the second member 23 is substantially longitudinal and fixed to a side of the second member 23 by screws or fasteners. A plate 22 of the electronic device is fixed to the second housing 21 and the second member 23, thus covering the second space 210. As shown in FIG. 3, the flexible wire S is extended from a connector C, through the first member 13 and a through hole 233 of the second member 23, to the second space 210 of the second housing 21. As shown in FIG. 4B, it should be noted that the first member 13 may have longitudinal slots 133 without longitudinal openings 132 when the through hole 233 is formed integrated with the slider 232.

The connector C is accommodated in the first space 110 and electrically connected to the display module (not shown). The flexible wire S electrically connects the display module and the input module or other circuits (not shown) disposed in the second housing 21. In some embodiments, a plurality of the flexible wires S may be applied for multiple signal transmission between the display module and the input module, wherein at least one connector C is provided for connecting the flexible wires S. However, for illustrating the motion of the flexible wires, five flexible wires S and one connector C are used for each side in the present embodiment.

Figure 4A:
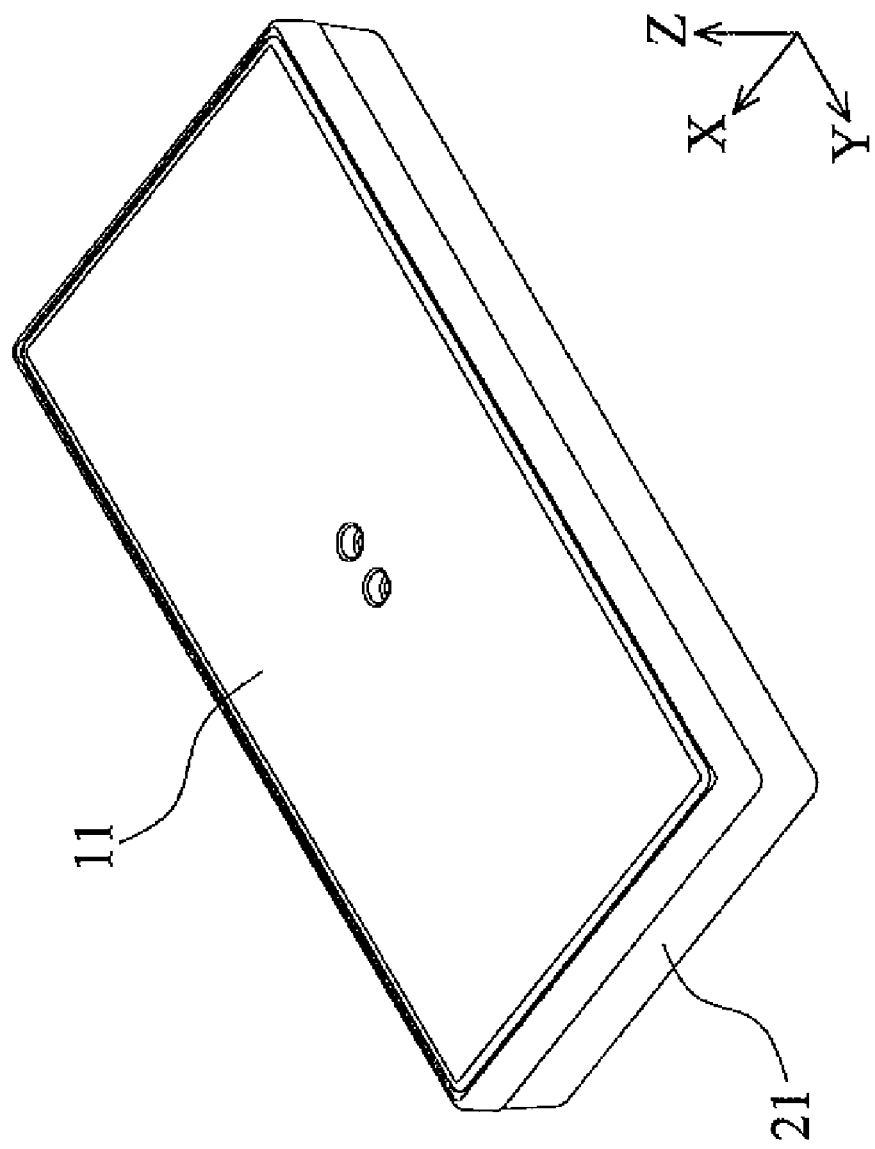
FIG. 4A is a perspective diagram of the electronic device of FIG. 3 when in a closed state.
Figure 4B:
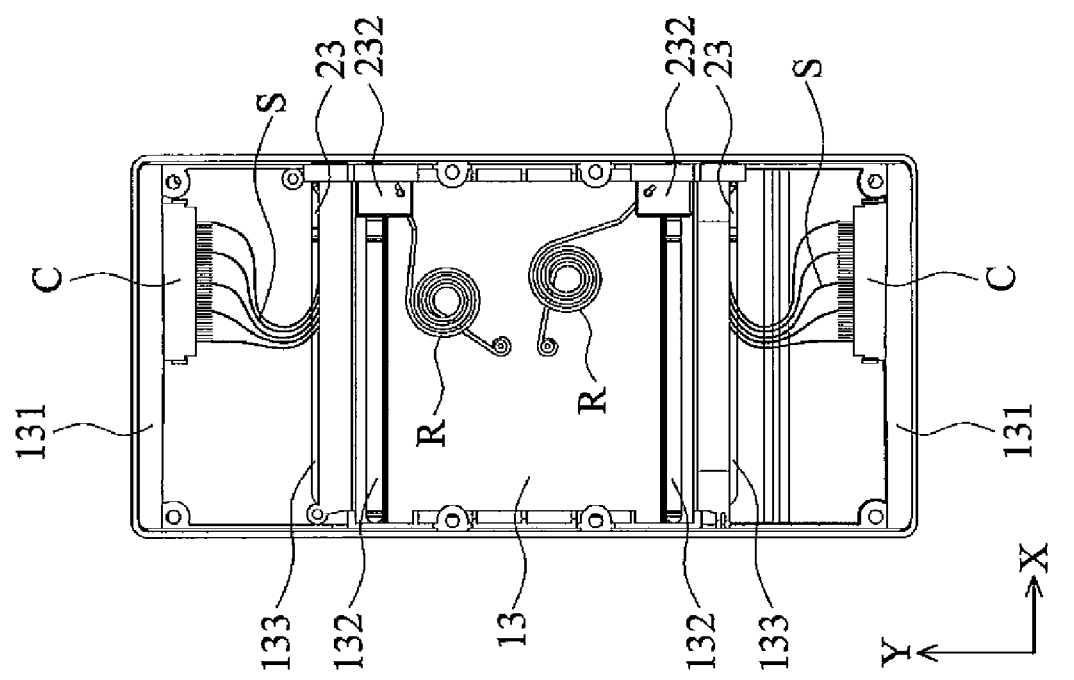
FIG. 4B is a top view of the electronic device in FIG. 4A.
Figure 5A:
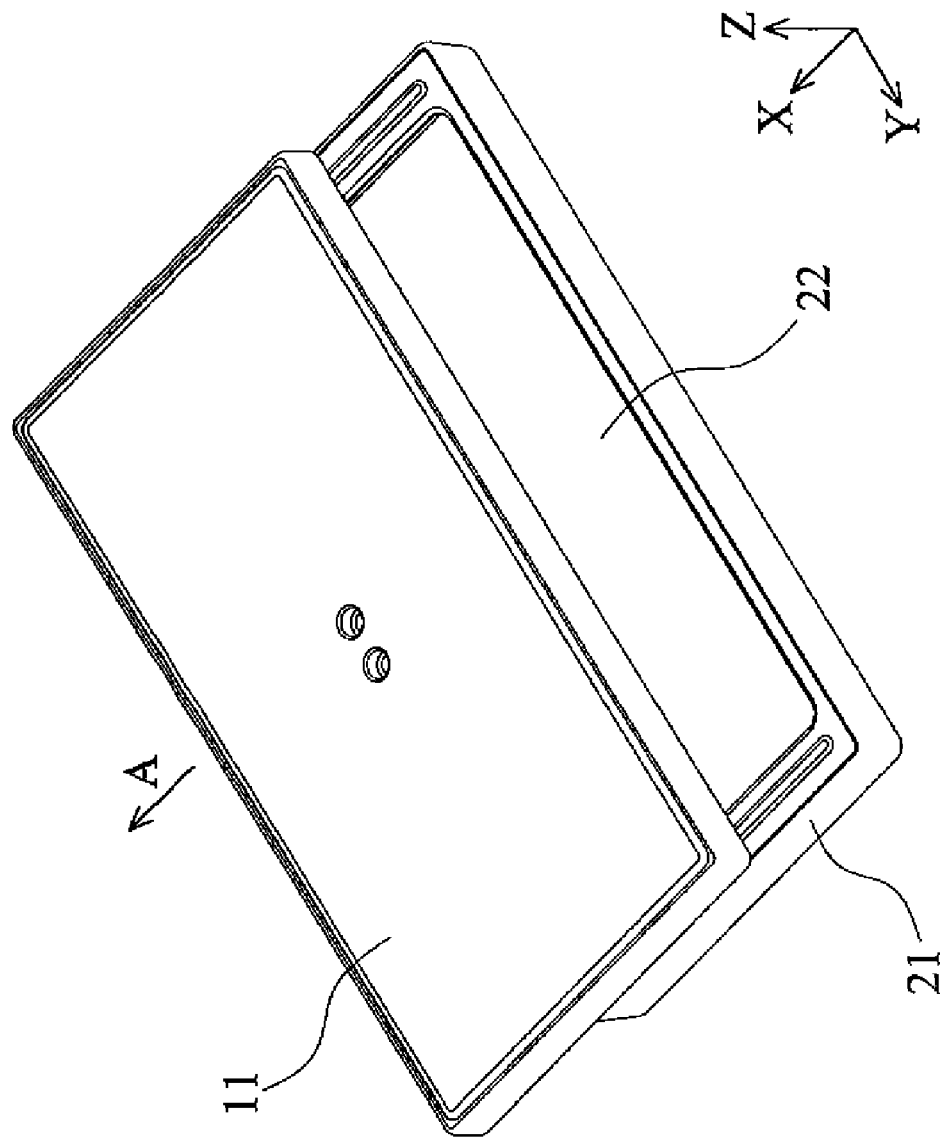
FIG. 5A is a perspective diagram of the electronic device of FIG. 3 when in a transition state.
Figure 5B:
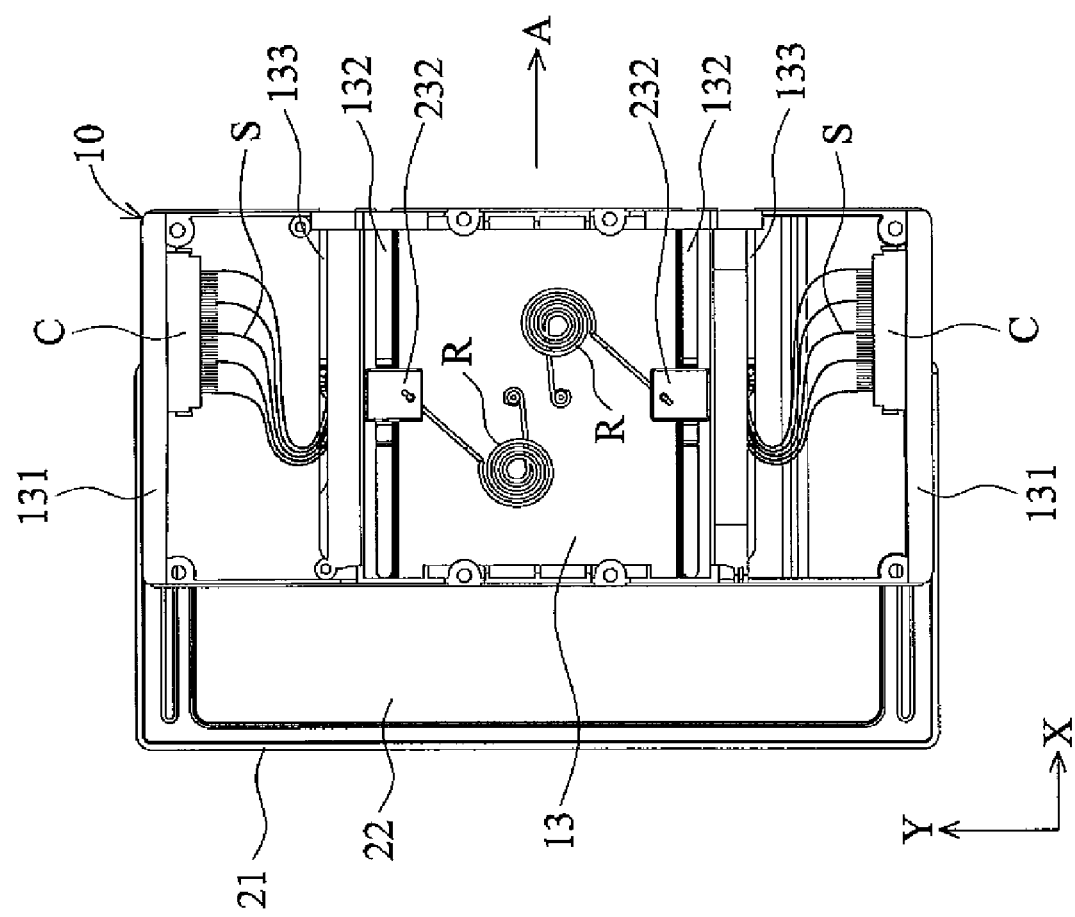
FIG. 5B is a top view of the electronic device in FIG. 5A.
Figure 6A:
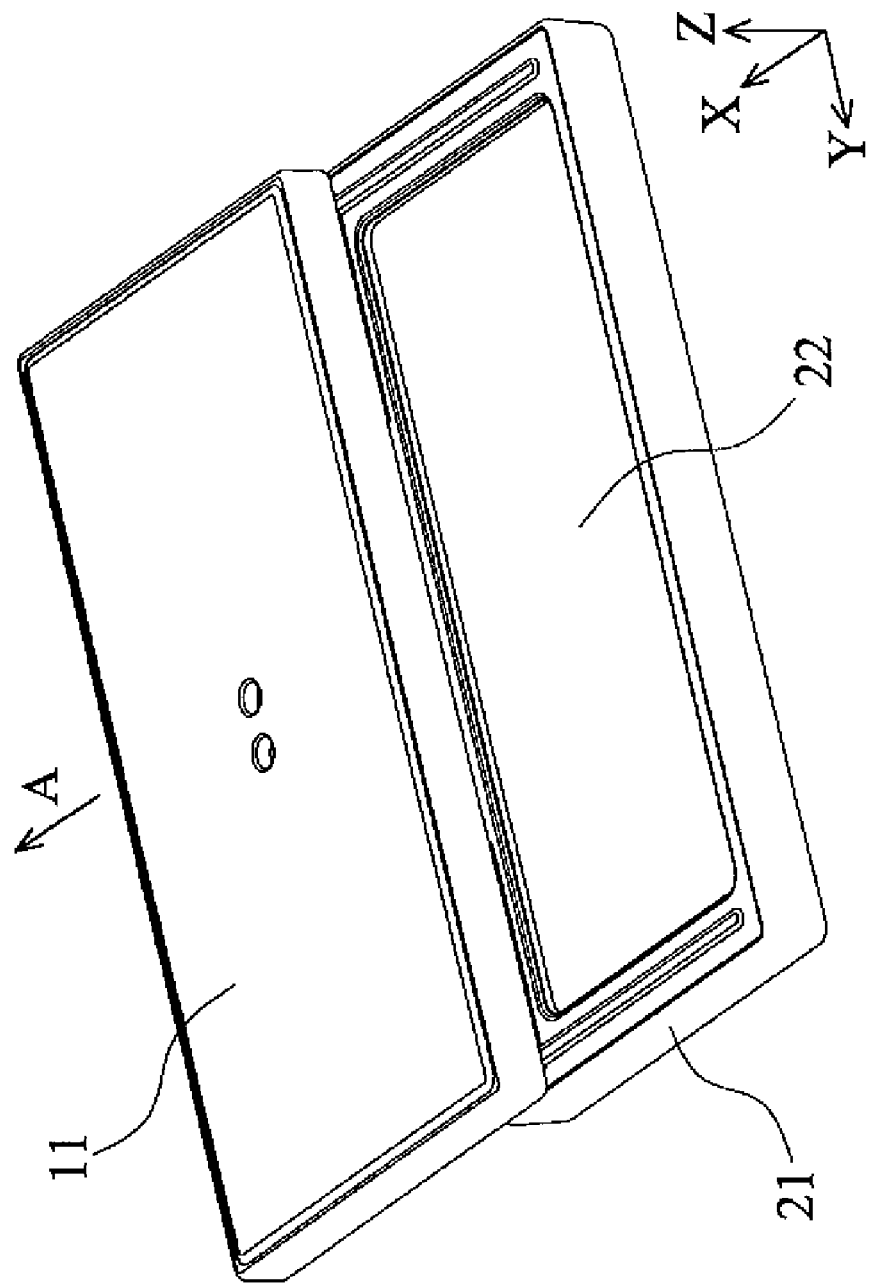
FIG. 6A is a perspective diagram of the electronic device of FIG. 3 when in an open state.
Figure 6B:
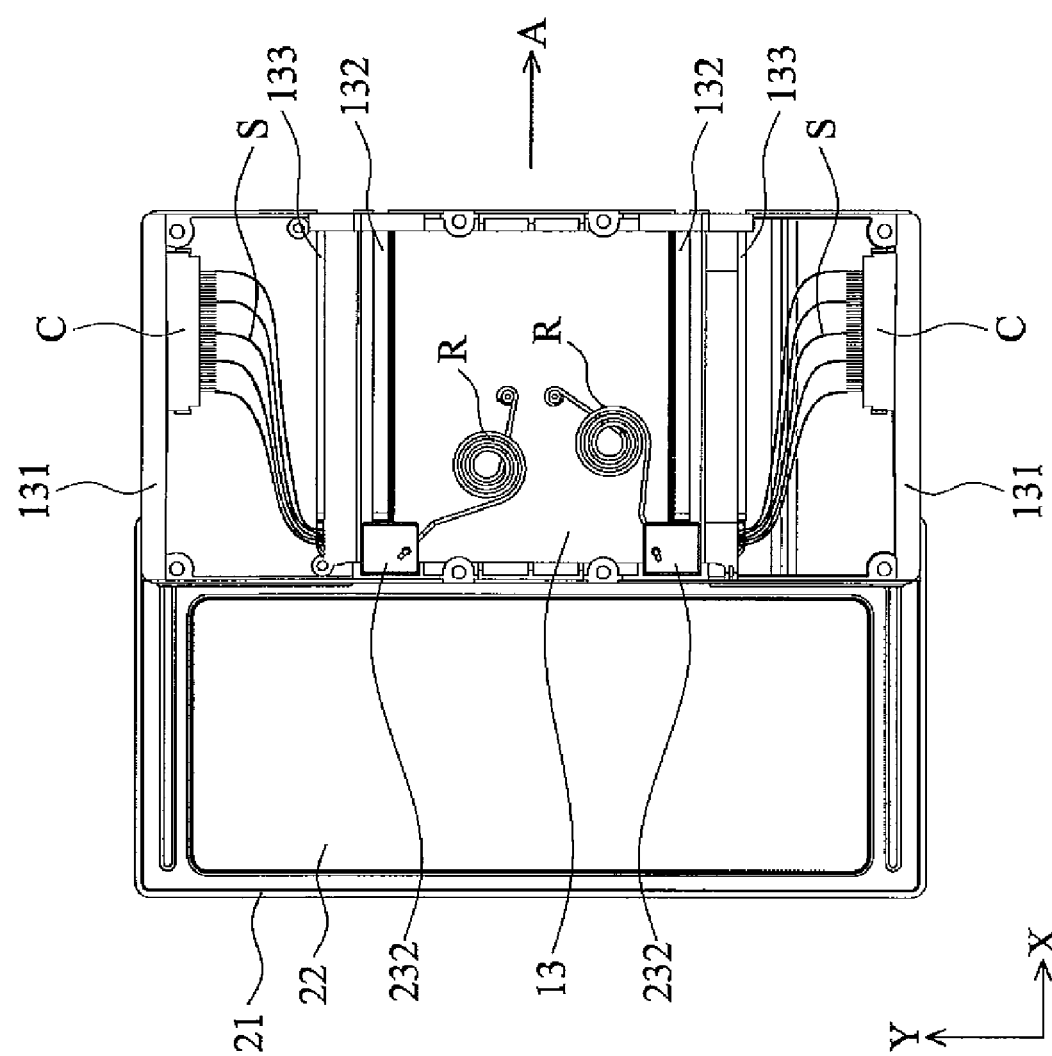
FIG. 6B is a top view of the electronic device in FIG. 6A.

FIGS. 4A, 5A and 6A are perspective diagrams of the electronic device of FIG. 3 when in closed state, transition state and open state, respectively. FIGS. 4B, 5B and 6B are top-views of the electronic device shown in FIGS. 4A, 5A and 6A, wherein the first housing 11 and the shield 12 are omitted therefrom. Referring to FIGS. 3 and 4B, the flexible wire S is extended from the connector C, through a longitudinal slot 133 of the first member 13 and the through hole 233 of the second member 23, to the second space 210 of the second housing 21. In this embodiment, the longitudinal opening 132 is substantially parallel to the rail 131 and the longitudinal slot 133.

Referring to FIGS. 3, 5A and 5B, when the first housing 11 slides relative to the second housing 21 along a first direction A to the transition state, the first member 13 moves relative to the second member 23 along the first direction A. During reciprocal sliding of the first and second housings 11 and 21, the flexible wire S is retained through the longitudinal slot 133 and the through hole 233 to the second space 210 without mechanical interference from the sliding mechanism, wherein a part of the flexible wire S may be adhered or fixed to the second member 23 to reduce the friction between the flexible wire S and the through hole 233.

In this embodiment, the flexible wire S has two-dimensional flexibility, rather than traditional FPC sheet having only one dimensional flexibility. As shown in FIGS. 4A–6B, as the longitudinal slot 133 allows the flexible wire S moving therethrough, mechanical interference or impact damage between the flexible wire S and the sliding mechanism is reduced. Moreover, as the flexible wire S is downwardly extended through the through hole 233 to the second space 210, the flexible wire S can be protected during reciprocal sliding of the first and second members 13 and 23.

Referring to FIGS. 3, 6A and 6B, when the first housing 11 moves relative to the second housing 21 along the first direction A to the open state, the first member 13 moves relative to the second member 23 along the first direction A to a limit position. During reciprocal sliding of the first and second housings 11 and 21, the flexible wire S is retained through the longitudinal slot 133 and the through hole 233 to the second space 210 without mechanical interference from the sliding mechanism. Moreover, with the flexible wire S directly extended through the second member 23 to the second space 210, the flexible wire S can be protected during reciprocal sliding of the first and second members 13 and 23.

The present application provides a sliding mechanism disposed between a first housing and a second housing of an electronic device. The sliding mechanism includes a first member and a second member reciprocally movable with respect to each other. A flexible wire is disposed through a longitudinal slot of the first member and a through hole of the second member for electrically connecting a display module in the first housing and an input module (or other circuits) in the second housing. The sliding mechanism can protect the flexible wire during reciprocal sliding of the first and second members. Furthermore, the sliding mechanism can facilitate overlap reduction of the first and second housings, thereby increasing available area on the second housing for other components, such as keypad or other input interfaces.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a first housing having a first space;
   a second housing having a second space, wherein the second housing is movable with respect to the first housing; and
   a sliding mechanism, comprising:
   a first member fixed to the first housing, wherein the first member has a longitudinal slot;
   a second member fixed to the second housing, wherein the second member has a through hole; and
   at least one flexible wire extended from the first space through the longitudinal slot and the through hole to the second space,
   wherein when the first member slides with respect to the second member, the flexible wire slides in the longitudinal slot.

2. The electronic device as claimed in claim 1, further comprising a display module disposed in the first space and an input module disposed in the second space, wherein the flexible wire electrically connects to the display module.

3. The electronic device as claimed in claim 1, wherein the first member further comprises a rail at an edge thereof, and the second member further comprises a sliding portion sliding along the rail.

4. The electronic device as claimed in claim 1, wherein the first member further comprises a longitudinal opening substantially parallel to the longitudinal slot, and the second member further comprises a slider sliding along the longitudinal slot.

5. The electronic device as claimed in claim 4, wherein the slider is T-shaped in cross-section and movably received in the longitudinal opening.

6. The electronic device as claimed in claim 4, further comprising an elastic member disposed on the first member and connected to the slider.

7. The electronic device as claimed in claim 6, further comprising a shield disposed on the first member to cover the elastic member.

8. The electronic device as claimed in claim 1, wherein the second member is substantially longitudinal and fixed to a side of the second housing.

9. The electronic device as claimed in claim 1, further comprising a plate disposed on the second housing and connected to the second member to cover the second space.

10. The electronic device as claimed in claim 1, wherein a part of the flexible wire is fixed to the second member.

11. A sliding mechanism movably connecting an input module and a display module of an electronic device, wherein the electronic device comprises at least one flexible wire, the sliding mechanism comprising:
    a first member having a longitudinal slot; and
    a second member movable with respect to the first member, wherein the second member has a through hole, the flexible wire is passed through the longitudinal slot and the through hole for electrically connecting the input module and the display module, wherein when the first member slides with respect to the second member, the flexible wire slides in the longitudinal slot.

12. The sliding mechanism as claimed in claim 11, wherein the first member further comprises a longitudinal opening substantially parallel to the longitudinal slot, and the second member further comprises a slider sliding along the longitudinal slot.

13. The sliding mechanism as claimed in claim 12, wherein the slider is T-shaped in cross-section and movably received in the longitudinal opening.

14. The sliding mechanism as claimed in claim 12, further comprising an elastic member disposed on the first member and connected to the slider.

15. The sliding mechanism as claimed in claim 11, wherein the first member further comprises a rail at an edge thereof, and the second member further comprises a sliding portion sliding along the rail.

16. The sliding mechanism as claimed in claim 11, wherein a part of the flexible wire is fixed to the second member.

* * * * *